United States Patent
Chen (10) Patent No.: US 9,646,203 B2
(45) Date of Patent: May 9, 2017

(54) METHOD AND APPARATUS FOR GENERATING MAP DATA BASED ON CONSTRUCTION DESIGNS

(71) Applicant: HERE Global B.V., Veldhoven (NL)

(72) Inventor: Xin Chen, Evanston, IL (US)

(73) Assignee: HERE Global B.V., Veldhoven (NL)

( * ) Notice: Subject to any disclaimer, the term of this patent is extended or adjusted under 35 U.S.C. 154(b) by 265 days.

(21) Appl. No.: 14/334,704

(22) Filed: Jul. 18, 2014

(65) Prior Publication Data

US 2016/0019419 A1   Jan. 21, 2016

(51) Int. Cl.
*G06K 9/00* (2006.01)
*G01C 21/32* (2006.01)

(52) U.S. Cl.
CPC ........ *G06K 9/00476* (2013.01); *G01C 21/32* (2013.01)

(58) Field of Classification Search
None
See application file for complete search history.

(56) References Cited

U.S. PATENT DOCUMENTS

| | | | | |
|---|---|---|---|---|
| 4,843,569 A | * | 6/1989 | Sawada | G01C 21/32 382/180 |
| 9,053,566 B1 | * | 6/2015 | Riggs | G06T 11/00 |
| 2010/0057336 A1 | * | 3/2010 | Levine | G01C 21/32 701/532 |
| 2011/0235923 A1 | * | 9/2011 | Weisenburger | G01C 11/00 382/201 |
| 2012/0197713 A1 | * | 8/2012 | Stroila | G01C 21/3614 705/14.49 |
| 2013/0088757 A1 | * | 4/2013 | Schmidtler | G06K 9/00469 358/462 |
| 2013/0114849 A1 | * | 5/2013 | Pengelly | G06F 17/289 382/103 |
| 2014/0081619 A1 | * | 3/2014 | Solntseva | G06F 17/289 704/3 |

* cited by examiner

*Primary Examiner* — Shefali Goradia
(74) *Attorney, Agent, or Firm* — Alston & Bird LLP (57) ABSTRACT

A method, apparatus and computer program product are provided for generating map data based on construction designs. In the context of a method, the method includes receiving a construction design, performing optical character recognition to detect characters within the construction design, extracting design features within the construction design, and generating map data based on the detected characters, and the extracted design features.

17 Claims, 5 Drawing Sheets

METHOD AND APPARATUS FOR GENERATING MAP DATA BASED ON CONSTRUCTION DESIGNS

TECHNOLOGICAL FIELD

An example embodiment of the present invention relates to generating maps and, more particularly, to a method, apparatus and computer program product for generating map data based on construction designs.

BACKGROUND

Current map generation is a reverse engineering process, in which the map is generated based on surveys, aerial photography, positioning data based on travel routes, or the like. These map generation processes are prone to errors, such as lacking features, features in incorrect locations, or the like. Further these map making processes have significant timing delays between the construction of the features such as roadways, building, or the like, and the generation of the map. The delays may be due to needing construction of the feature to be complete prior to the survey, photography, or positioning data being generated which is thereafter processed to generate the map.

BRIEF SUMMARY

A method, apparatus and computer program product are provided in accordance with an example embodiment for generating map data based on construction designs. In an example embodiment, a method is provided that includes receiving a construction design, performing optical character recognition to detect characters within the construction design, extracting design features within the construction design, and generating, using a processor, map data based on the detected characters, and the extracted design features. In an example embodiment, the method also includes binarizing the construction design prior to performing optical character recognition. In some example embodiments, the method also includes determining a construction theme based on the detected characters.

In an example embodiment of the method, the design features are assigned a probability value based on the construction theme and generating map data is based on the respective design feature probability value satisfying a predetermined probability threshold. In some example embodiments, the method also includes receiving an image associated with the construction design, extracting image features from the image, determining deviations between the design features and the image features, and altering the map data based on the deviations.

In some example embodiments of the method the image is an aerial image. In an example embodiment, the method also includes receiving position data associated with construction design, extracting feature positions based on the position data, determining deviations between the design features and the feature positions, and altering the map data based on the deviations.

In another example embodiment, an apparatus is provided including at least one processor and at least one memory including computer program code with the at least one memory and computer program code configured to, with the processor, cause the apparatus to at least receive a construction design, perform optical character recognition to characters within the construction design, extract design features within the construction design, and generate map data based on the detected characters, and the extracted design features. In an example embodiment of the apparatus, the at least one memory and the computer program code are further configured to binarize the construction design prior to performing optical character recognition.

In an example embodiment of the apparatus, the at least one memory and the computer program code are further configured to determine a construction theme based on the detected characters. In some example embodiments of the apparatus, the design features are assigned a probability value based on the construction theme and generating map data is based on the respective design feature probability value satisfying a predetermined probability threshold. The at least one memory and the computer program code, of an example embodiment of the apparatus are further configured to receive an image associated with the construction design, extract image features from the image, determine deviations between the design features and the image features, and alter the map data based on the deviations. In some example embodiments of the apparatus, the image is an aerial image. In an example embodiment of the apparatus, the at least one memory and the computer program code are further configured to receive position data associated with construction design, extract feature positions based on the position data, determine deviations between the design features and the feature positions, and alter the map data based on the deviations.

In a further example embodiment a computer program product is provided including at least one non-transitory computer-readable storage medium having computer-executable program code portions stored therein with the computer-executable program code portions comprising program code instructions configured to receive a construction design, perform optical character recognition to detect characters within the construction design, extract design features within the construction design, and generate map data based on the detected characters, and the extracted design features. In some example embodiments of the computer program product, the computer-executable program code portions further comprise program code instructions configured to binarize the construction design prior to performing optical character recognition. The computer-executable program code portions of an example embodiment of the computer program code further comprise program code instructions configured to determine a construction theme based on the detected characters. In an example embodiment of the computer program product, the design features are assigned a probability value based on the construction theme and the generating map data is based on the respective design feature probability value satisfying a predetermined probability threshold.

In an example embodiment of the computer program product, the computer-executable program code portions further comprise program code instructions configured to receive an image associated with the construction design, extract image features from the image, determine deviations between the design features and the image features, and alter the map data based on the deviations. The computer-executable program code portions, of an example embodiment of the computer program product, further comprise program code instructions configured to receive position data associated with construction design, extract feature positions based on the position data, determine deviations between the design features and the feature positions, and alter the map data based on the deviations.

In yet another example embodiment, an apparatus is provided that includes means for receiving a construction design, means for performing optical character recognition to detect characters within the construction design, means for extracting design features within the construction design, and means for generating map data based on the detected characters, and the extracted design features.

BRIEF DESCRIPTION OF THE DRAWINGS

Having thus described example embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

Overview

Errors in map generation may be greatly reduced by using construction designs, such as civil engineering designs for roadways and buildings. Construction designs contain highly accurate and detailed information which may be used to generate the map data. The map data generated using the construction designs can then be verified and corrected for deviation after construction using surveys, aerial photography, positioning systems, or the like.

Additionally, the maps generated using construction designs may be generated months or years before the construction is completed or started. In most infrastructure contracts the design and specification is available on public record when the contract is signed. By using the engineering drawings to generate a map, the map may be available for use as soon as the construction is complete with reduced or no delay. Further, the map may be used to illustrate features under construction or will be constructed for future planning before construction commences.

In addition to data that may be derived from a survey or aerial photography, construction designs, for example a roadway design, may have additional information which could be used in map generation, such as estimated traffic or maintenance of traffic.

The trend in civil engineering firms to use micro-station software to render construction designs may allow the extraction of features of the construction design to be performed efficiently with few errors, due to a consistent representation of content features.

Communications Diagram

Figure 1:
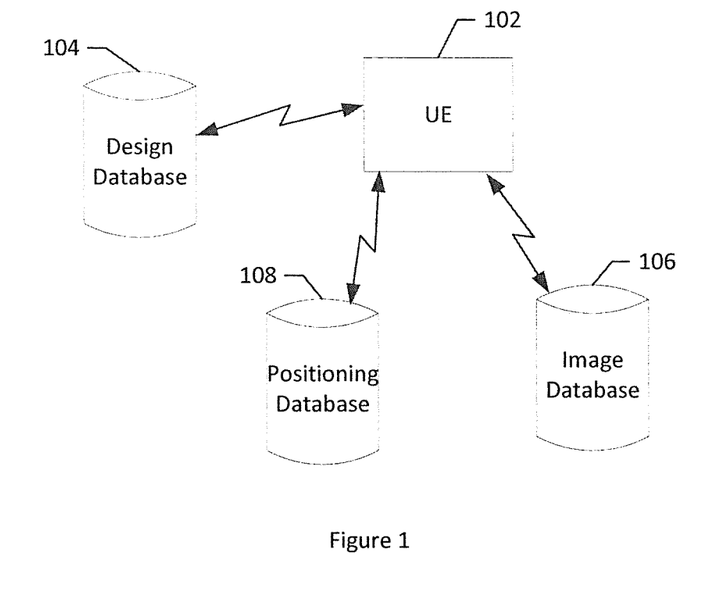
FIG. 1 illustrates a communications diagram in accordance with an example embodiment of the present invention.

A method, apparatus and computer program product are provided in accordance with an example embodiment for generating map data based on construction designs. FIG. 1 illustrates a communication diagram including user equipment (UE) 102, in data communications with a design database 104, an image database 106, and a positioning database 108. The UE 102 may include the design database 104, image data base 106, and/or the positioning database 108, such as in a local data memory, or the design database 104, image data base 106, and/or the positioning database 108 may be stored in one or more remote database(s), such as maintained by a remote data server. The UE 102 may be a mobile computing device, such as a laptop computer, tablet computer, mobile phone, smart phone, navigation unit, personal data assistant, or the like. Additionally or alternatively, the UE 102 may be a fixed computing device, such as a personal computer, computer workstation, kiosk, office terminal computer or system, or the like.

The UE 102 may receive a construction design from the design database 104 for generation of map data. The construction design may be civil engineering drawings or plans which may include roadways, bridges, airports, railways, buildings, or the like. The design database may be a government managed database for construction designs, such as may be maintained by the department of transportation, county highway department, city department of transportation, city metro city transportation authority, or the like. Additionally or alternatively, the construction designs may be imported into a design database 104 which stores respective engineering drawings for reference or specifically for map rendering.

The UE 102 may binarize the construction design by applying a threshold segmentation algorithm to the construction design. The UE may binarize the construction design itself or may cooperate with another computing device to have the construction design binarized and then returned to the UE. The resultant binarized construction design may have a first value, such as 1, applied to any pixel which satisfies a globally determined threshold, e.g. a black pixel. The binarized construction design may have a second value, such as 0, assigned to pixels which do not satisfy the globally determined threshold, e.g. a white pixel.

In some example embodiments, the UE 102 may apply morphological operations on the binarized image as preprocessing for subsequent optical character recognition (OCR) and feature extraction. Morphological operations may include erosion, dilation, complement, intersections, union, opening, closing, or the like.

The UE 102 may perform an OCR, such as matrix matching or feature extraction, to determine characters, such as letters numbers, symbols, or the like, present in the construction design. The UE 102 may determine construction theme data, such as state highway, interstate highway, city street, rural road, or the like, based on the characters detected by the OCR. The UE 102 may identify words, numbers, or word number combinations which correspond to predetermined construction themes, such as lane numbers, lane paint designators, highway identifiers, building identifiers, road identifiers, exit numbers, on ramp identifiers, intersection identifiers, structure shapes, or the like. Additionally or alternatively, a user may enter or validate construction themes. For example, a construction theme may be a roadway exit, an overpass, a roundabout, intersection, highway merger, road or rail way, building or other structure, or the like.

The UE 102 may associate construction theme with probable features. In an instance in which the construction theme is a roadway exit, probable features may include an increase in number of lanes, a lane diverging into an exit, or the like. The UE 102 may also determine improbable design features which would not be associated with the construction theme, e.g. roadway exit, such as a roundabout, intersection, decrease in lanes, or the like.

The UE 102 may extract design features from the construction design. The UE 102 may extract design features using a feature extraction process, such as a histogram of oriented gradients (HOG), local binary pattern (LBP), Haarlike, spares coding, or the like. Design features may include, lanes, medians, building shapes, intersections, exits, on ramps, railways, runways, roadways, or the like.

The UE 102 may determine a probability value for the extracted features based on the construction theme. A design feature which corresponds to a probable feature may be assigned a higher value than a design feature not corresponding to a probable or improbable feature. Further a design feature associated with an improbable feature may have a lower probability value than the design feature associated with neither the probable or improbable features.

In some example embodiments, the probability values may be further based on associated extracted design features. For example, in an instance in which the UE 102 extracts design features corresponding to an exit ramp and an increase in lanes, the mutual existence in the construction design may increase the probability for both features.

The UE 102 may compare the design feature probability values to a predetermined probability threshold. The design features which satisfy the predetermined probability threshold, such as 80 percent, may be used as a portion of the map data. Design features which fail to satisfy the probability threshold may be discarded from further processing and, as a result, are not included in the map data.

In an example embodiment, the design feature probability values and/or probability threshold determinations may be verified or updated by a user, to reduce errors. In a further example embodiment, the outcome of the design feature probability and/or probability threshold determinations may be fedback into the determination of construction themes for machine learning The UE 102 may generate map data by generating a composite of the extracted design features or the design features which satisfied the predetermined probability threshold.

In an example embodiment, the UE 102 may verify and/or alter the map data based on the images or positioning data. The UE 102 may receive an image associated with the construction design. The image associated with the construction design may be an aerial image, a survey, street level imagery, 3D range scanning such as light detection and ranging (Lidar), or other rendering associated with the construction design during or after construction. The aerial image may an image which includes at least one roadway, railway, structure, or the like, from a substantially overhead position, e.g. the image is taken looking down upon a subject of the engineering drawing.

Alternatively or additionally, the UE 102 may receive positioning data associated with the construction design. For example, the positioning data may be global positioning system (GPS) data generated by a GPS system onboard a vehicle or carried by a person traveling a route based on the construction design, such as driving the roadway depicted in the engineering drawings, walking around a building foot print, or indicating when a GPS sensor is at a predetermined object or feature. The positioning data may be indicative of the shape of the building or route of a roadway, railway, a specific object or feature location, or the like.

The UE 102 may extract image features from the image The UE 102 may extract the image features using a feature extraction process, such as edge detection, curvature modeling, pattern matching, transformation, or the like.

The UE 102 may also extract feature positions based on positioning data. For example, the feature positions may be associated with the corners of a building, the start and end point of a turn, a specific feature, or the like. The feature positions may be indicated by a change in the positioning date such as a change in direction or an input indicative of the GPS sensor being at a specified object or feature.

The UE 102 may normalize the scale of the map data and image features and/or feature positions. The normalization of the image ensures a uniform scale, such as 50×100 pixels, is used in the process to reduce errors. The UE 102 may compare the design features associated with map data to the image features and/or the feature positions to determine deviations between the map data design features and the image features and/or feature positions. The UE 102 may utilize image subtraction to detect deviations between the map data and the image features or feature positions, which is the difference in the subtraction. In an example embodiment the UE 102 may utilize feature matching to determine deviations, for example, the UE may determine the distance between two feature vectors.

The UE 102 may alter the map data based on the deviations, for example if the image features and/or the feature positions indicate that a roadway commences a turn 50 feet before the design feature indication of the roadway turn, the map data may be altered to be consistent with the image feature and/or feature position.

In an example embodiment, the UE 102 may have a programmatically determined or manually set deviation threshold. The deviation threshold may prevent erroneous altering of the map data, based on inaccuracies in the positioning data of an image. The UE 102 may determine if a deviation satisfies the predetermined deviation threshold, e.g. 5 feet, 10 feet, $\frac{1}{10}$ mile, or any other distance. In an instance in which the UE 102 determines that the deviation satisfies the deviation threshold, the feature(s) may be altered to be consistent with the image feature or feature position. In an instance in which the deviation fails to satisfy the deviation threshold, the map data is not altered for the respective features.

In an example embodiment, the UE 102 may additionally determine construction dates associated with the map data, such as open for use date, completion date, or the like. The dates may be a portion of or otherwise associated with the construction design, such as detected by OCR, associated construction time tables, or the like. The UE 102 may activate the map data based on the construction dates, such as on or prior to the construction completion or open for use date. In an instance in which a map exists associated with a portion of the map data, the UE 102 may update the existing map or maps based map data, or replace all or a portion of the map with the map data. In an instance in which a map does not exist, the UE 102 may activate the map data by publishing or allowing access to the map data.

Example Apparatus

Figure 2:
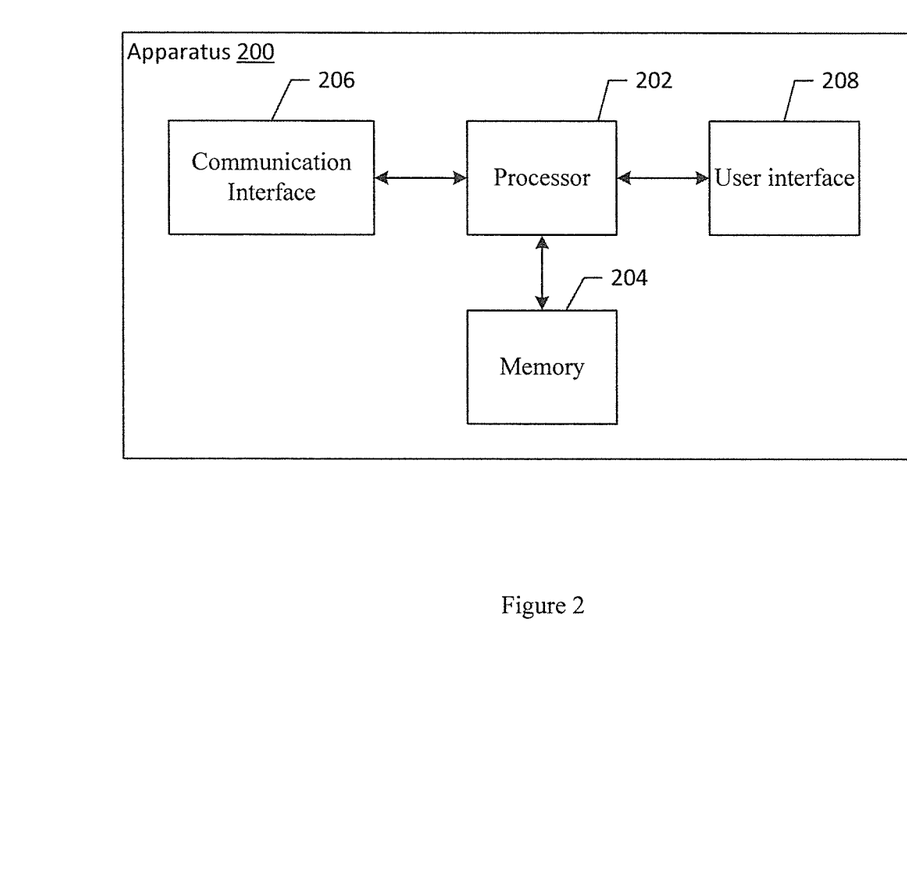
FIG. 2 is a block diagram of an apparatus that may be specifically configured for generating map data based on construction designs in accordance with an example embodiment of the present invention.

A UE 102 may include or otherwise be associated with an apparatus 200 as shown in FIG. 2. The apparatus, such as that shown in FIG. 2, is specifically configured in accordance with an example embodiment of the present invention for generating map data based on construction designs. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by UE 102. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data from/to a communications device in communication with the apparatus, such as to facilitate communications with one or more user equipment 110, utility device, or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example Construction Design

Figure 3:
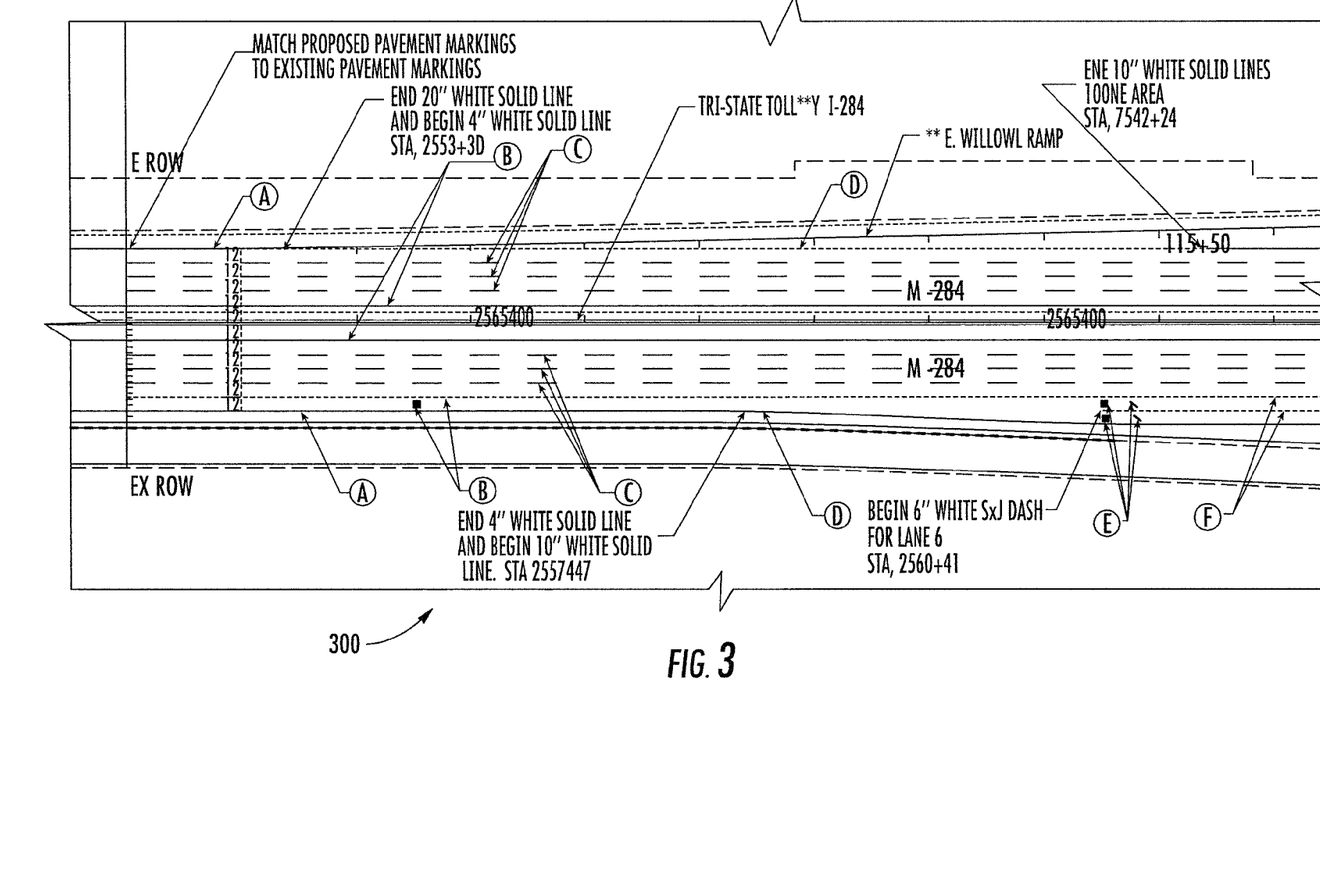
FIG. 3 illustrates an example construction design for a highway in accordance with an example embodiment of the present invention.

FIG. 3 illustrates an example construction design for a highway in accordance with an example embodiment of the present invention. The construction design depicts a portion of an eight lane highway, specifically Interstate 294. The portion of highway includes an on ramp, an exit ramp median, lane marking, and the like. The construction design also includes text indicating identifiers for features and lane marking patterns.

Example Construction Design with OCR and Extracted Feature Overlay

Figure 4:
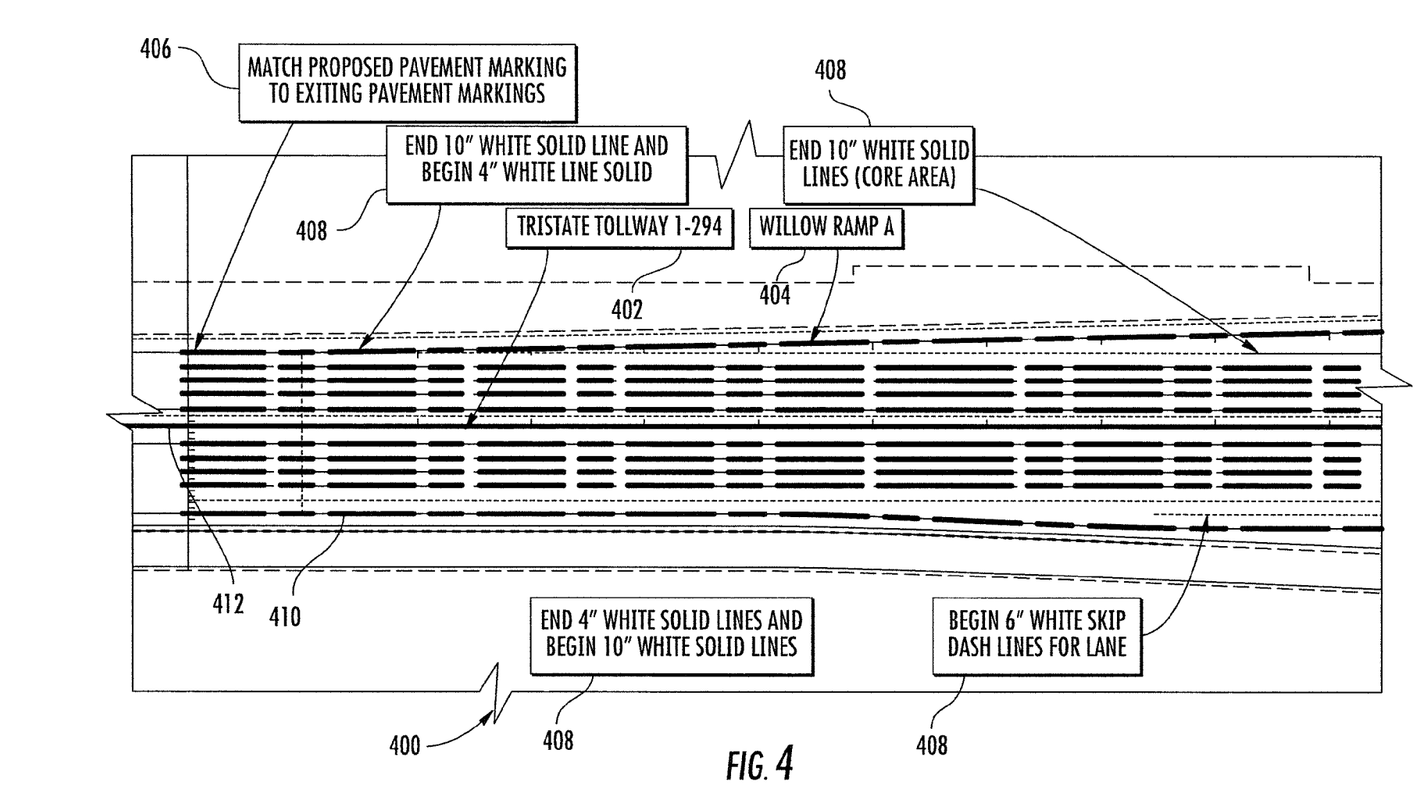
FIG. 4 illustrates an example construction design with an overlay of optical character recognition and feature extraction in accordance with an embodiment of the present invention.

FIG. 4 illustrates an example construction design with an overlay of optical character recognition and feature extraction in accordance with an embodiment of the present invention. The construction design 400 is depicted with the extracted features 410 and OCR text overlaid to give visual context and association to the extracted features and the OCR text. The extracted features include the four lane indicators 410 on each side of the median 412. The outermost lane indicators 410, on each side of the median 412, diverge from the center to accommodate the respective on ramp and exit ramp. Other features may be extracted, but are not depicted for clarity of the figure include on ramp and exit ramp lanes, break down lanes, or the like.

The OCR text includes a roadway identifier 402, "Tristate Tollway I-294," and an Exit identifier 404, "Willow Ramp A," which may indicate a roadway exit construction theme for the depicted roadway portion. The OCR text includes other indicators of the roadway exit construction theme 406, such as "match proposed pavement markings to exit pavement markings." The OCR text additionally includes lane marking indicators 408, which may indicate the speed limits, change in lane number, exit or on ramp, or the like.

Example Process for Generating Map Data Based On Construction Designs

Figure 5:
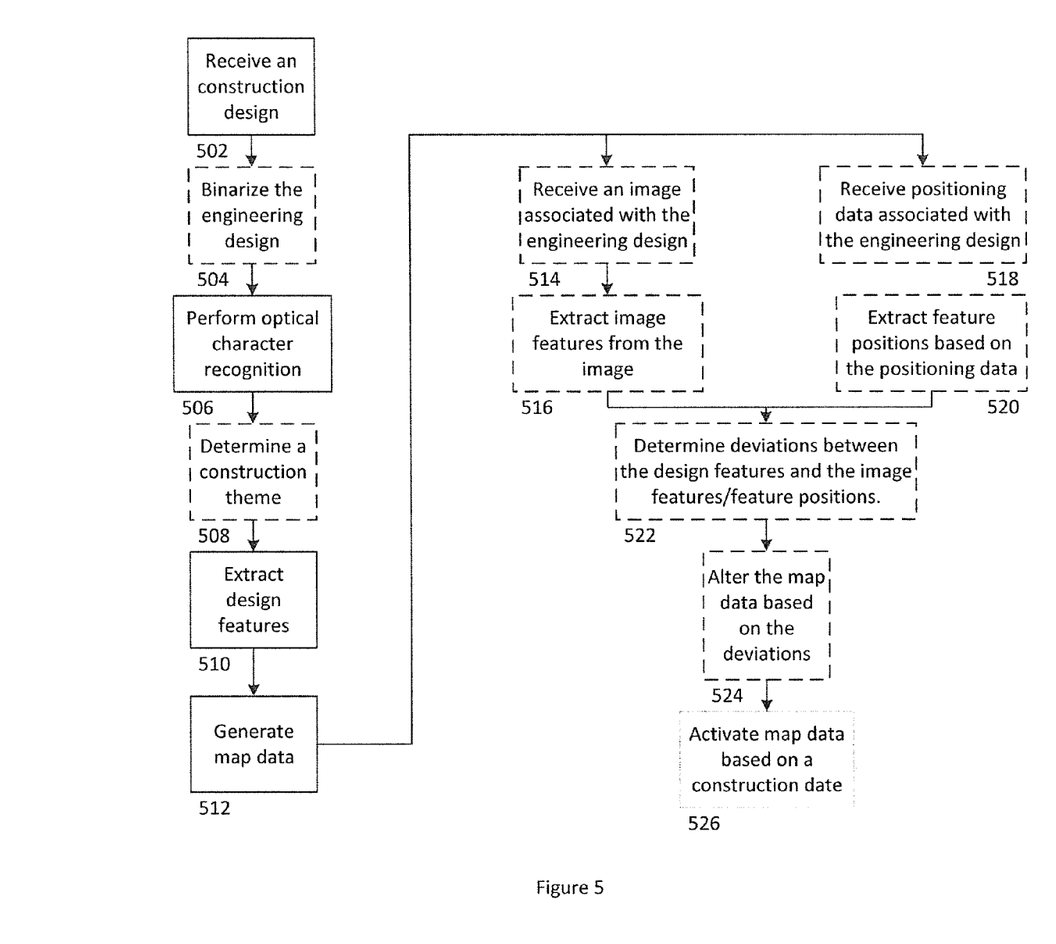
FIG. 5 is a flow chart illustrating the operations performed, such as by the apparatus of FIG. 2, in accordance with an example embodiment of the present invention.

Referring now to FIG. 5, the operations performed, such as by the apparatus 200 of FIG. 2, for generating map data based on construction designs are depicted. As shown in block 502 of FIG. 5, the apparatus 200 may include means, such as a processor 202, a memory 204, a communications interface 206, or the like, configured to receive a construction design. The processor 202 may receive the construction design from the communications interface 206, which in turn may receive the construction design from a memory 204, such as the design database 104.

As shown in block 504 of FIG. 5, the apparatus 200 may include means, such as a processor 202, or the like, configured to binarize the construction design. The processor 202 may apply a segment threshold algorithm based on a global threshold to the construction design resulting in a binarized construction design having a first pixel value, e.g. 1, for a first color, such as black, and a second pixel value, e.g. 0, for a second color, such as white.

In some example embodiments, the apparatus 200 may apply morphological operations on the binarized image as preprocessing for subsequent optical character recognition (OCR) and feature extraction. Morphological operations may include erosion, dilation, complement, intersections, union, opening, closing, or the like.

As shown at block 506, of FIG. 5, the apparatus 200 may include means, such as a processor 202, or the like, configured to perform optical character recognition. The processor 202 may detect characters, such as letters, numbers, symbols or the like, present in the construction design by applying an OCR, such as, matrix matching or feature extraction.

As shown in block 508, of FIG. 5, the apparatus 200 may include means, such as a processor 202, or the like, configured to determine a construction theme. The processor 202 may identify words, numbers, or word/number combinations from the OCR characters, e.g. text which correspond to predetermined construction themes, such as lane numbers, lane paint designators, highway identifiers, building identifiers, road identifiers, exit numbers, on ramp identifiers, traffic flow, or the like. Additionally or alternatively, a user may enter or validate construction themes using a user interface 208. The processor 202 may associate the determined construction theme with probable design features and improbable design features. The processor 202 may probable and improbable design features may be a predetermined rule set for the determined design theme. For example, it would be probable for an interstate highway to have an exit ramp, and improbable that the interstate highway have a circular intersection. Similarly, it would be improbable that a city street have eight lanes, and probable that the city street have a four way stop.

As shown at block 510 of FIG. 5, the apparatus 200 may include means, such as a processor 202, or the like, configured to extract design features from the construction design. The processor 202 may extract the design features using a feature extraction process, such as histogram of oriented gradients (HOG), local binary pattern (LBP), Haar-like, spares coding, or the like.

As shown at block 512 of FIG. 5, the apparatus 200 may include means, such as a processor 202, or the like, configured to generate map data. The processor 202 may determine a probability value for respective features based on the construction theme. The processor 202 may further determine probability values based on associated design features.

The processor 202 may compare the probability values of the respective design features to a predetermined probability threshold. Design features which satisfy the probability threshold may be used as a portion of map data. Design features which do not satisfy the probability threshold may be discarded from further processing.

In an example embodiment, the processor may use the outcome of the probability value determinations and the outcome of the threshold determination as feedback into the probability value assignment for machine learning.

The processor 202 may generate map data by generating a composite of the extracted design features or the design features which have satisfied the predetermined threshold.

The process may continue at either or both of block 514 receiving an image associated with the construction design or block 518 receiving position data associated with the construction design.

As shown at block 514 of FIG. 5, the apparatus 200 may include means, such as a processor 202, memory 204, communications interface 206, or the like, configured to receive an image associated with the construction design. The image associated with the construction design may be an aerial image, a survey, street level imagery, 3D range scanning such as Lidar, or other rendering associated with the construction design during or after construction. The processor 202 may receive the image associated with the construction design from the communications interface 206, which may in turn receive the image from a memory 204, such as the image database 106.

As shown at block 516 of FIG. 5, the apparatus 200 may include means, such as a processor 202, or the like, configured to extract image features from the image. The processor 202 may extract the image features and/or the feature positions using a feature extraction process, such as edge detection, curvature modeling, pattern matching, transformation, or the like. The process may continue at block 522 determination of deviation between design features and image features and/or feature positions.

As shown at block 518 of FIG. 18, the apparatus 200 may include means, such as a processor 202, a memory 204, a communications interface 206, or the like, configured to receive position data associated with construction design. The processor 202 may receive the position data from the communications interface 206, which in turn may receive the position data from a memory 204, such as the positioning database 108. The position data may be indicative of a building shape, or roadway route, specific object or feature location, or the like.

As shown at block 520 of FIG. 5, the apparatus 200 may include means, such as a processor 202, or the like, configured to extract feature positions based on position data. The processor 202 may extract data associated with a change in position data such as a change in direction, indicating the start of a turn, or a corner of a building. Additionally or alternatively, the position data may have specific object or locations marked in the position data, which may also be extracted.

As shown at block 522 of FIG. 5, the apparatus 200 may include means, such as a processor 202, or the like, configured to determine deviations between the design features of the map data and the image features and/or feature positions. The processor 202 may normalize the scale of the map data and image features and/or feature positions, e.g. match the scale of the design features and the image features or feature positions. The processor 202 may compare the design features associated with map data to the image features and/or the feature positions to determine deviations between the map data design features and the image features and/or the feature positions. In an example embodiment, the processor 202 may utilize image subtraction to detect deviations, which is the difference in the subtraction. In some example embodiments, the processor 202 may utilize feature matching, for example, the processor may determine the distance between two feature vectors.

As shown at block 524 of FIG. 5, the apparatus 200 may include means, such as a processor 202, or the like, configured to alter map data based on the image features and/or feature positions. The processor 202 may have a programmatically determined or manually set deviation threshold. The processor 202 may determine if a deviation satisfies the predetermined deviation threshold, e.g. 5 feet, 10 feet, 1/10 mile, or any other distance. In an instance in which the processor 202 determines that the deviation satisfies the deviation threshold, the feature(s) may be altered in the map data to be consistent with the image feature or feature position. In an instance in which the deviation fails to satisfy the deviation threshold, the map data is not altered for the respective features.

As shown at block 526 of FIG. 5, the apparatus 200 may include means such as a processor 202, a memory 204, configured to activate the map data in a map based on a construction date. The processor 202 may determine a construction date, such as construction completion, open for use, or other dates associated with the construction design. For example, the processor 202 may determine a construction date based on the detected characters, or associated construction time tables. In an embodiment in which a map exists associated with map data, the processor 202 may activate the map data by updating map features based on the map data or replace the map or portions of the map with the map data. In an instance in which a map does not exist associated with the map data, the processor 202 may activate the map data by publishing or allowing access to the map data. The processor 202 may activate the map data on or prior to the completion date, open for use date, or other construction date.

More robust and error free maps may be generated in accordance with an example embodiment of the present invention using engineering drawings which contain highly accurate and detailed information, and in some instances may have additional information which could be used in map generation, such as estimated traffic or maintenance of traffic, which may be used to generate the map data. Additionally, the map data generated in accordance with an example embodiment of the present invention using the engineering drawings can be verified and corrected for deviation after construction using surveys, aerial photography, positioning systems, or the like.

The maps generated using construction designs may be generated months or years before the construction is completed or started based on publicly available records. By using the engineering drawings to generate a map, the map may be available for use as soon as the construction is complete with reduced or no delay.

As described above, FIG. 5 illustrates a flowchart of an apparatus 200, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of blocks 504, 508, 514, 516, 518, 520, 522, and 524 in FIG. 5. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving a construction design;
performing optical character recognition to detect characters within the construction design;
determining a construction theme based on detected characters;
extracting design features within the construction design, wherein the design features are assigned a probability value based on the construction theme; and
generating, using a processor, map data based on the detected characters, and the extracted design features based on the respective design feature probability value satisfying a predetermined probability threshold.

2. The method of claim 1 further comprising:
binarizing the construction design prior to performing optical character recognition.

3. The method of claim 1 further comprising:
receiving an image associated with the construction design;
extracting image features from the image;
determining deviations between the design features and the image features; and
altering the map data based on the deviations.

4. The method of claim 3, wherein the image is an aerial image.

5. The method of claim 1 further comprising:
receiving position data associated with construction design;
extracting feature positions based on the position data;
determining deviations between the design features and the feature positions; and
altering the map data based on the deviations.

6. The method of claim 1 further comprising:
activate map data based on a construction date.

7. An apparatus comprising at least one processor and at least one memory including computer program code, the at least one memory and computer program code configured to, with the processor, cause the apparatus to at least:
receive a construction design;
perform optical character recognition to detect characters within the construction design;
determine a construction theme based on the detected characters;
extract design features within the construction design, wherein the design features are assigned a probability value based on the construction theme; and
generate map data based on the detected characters, and the extracted design features based on the respective design feature probability value satisfying a predetermined probability threshold.

8. The apparatus of claim 7, wherein the at least one memory and the computer program code are further configured to:
binarize the construction design prior to performing optical character recognition.

9. The apparatus of claim 7, wherein the at least one memory and the computer program code are further configured to:
receive an image associated with the construction design;
extract image features from the image;
determine deviations between the design features and the image features; and
alter the map data based on the deviations.

10. The apparatus of claim 7, wherein the image is an aerial image.

11. The apparatus of claim 7, wherein the at least one memory and the computer program code are further configured to:
receive position data associated with construction design;
extract feature positions based on the position data;
determine deviations between the design features and the feature positions; and
alter the map data based on the deviations.

12. The apparatus of claim 7, wherein the at least one memory and the computer program code are further configured to:
activate map data based on a construction date.

13. A computer program product comprising at least one non-transitory computer-readable storage medium having computer-executable program code portions stored therein, the computer-executable program code portions comprising program code instructions configured to:
receive a construction design;
perform optical character recognition to detect characters within the construction design;
determine a construction theme based on the detected characters;
extract design features within the construction design, wherein the design features are assigned a probability value based on the construction theme; and
generate map data based on the detected characters, and the extracted design features based on the respective design feature probability value satisfying a predetermined probability threshold.

14. The computer program product of claim 13, wherein the computer-executable program code portions further comprise program code instructions configured to:
binarize the construction design prior to performing optical character recognition.

15. The computer program product of claim 13, wherein the computer-executable program code portions further comprise program code instructions configured to:
receive an image associated with the construction design;
extract image features from the image;
determine deviations between the design features and the image features; and
alter the map data based on the deviations.

16. The computer program product of claim 13, wherein the computer-executable program code portions further comprise program code instructions configured to:
receive position data associated with construction design;
extract feature positions based on the position data;
determine deviations between the design features and the feature positions; and
alter the map data based on the deviations.

17. The computer program product of claim 13, wherein the computer-executable program code portions further comprise program code instructions configured to:
activate map data based on a construction date.

* * * * *